United States Patent
Pismenny et al.

(10) Patent No.: US 11,979,340 B2
(45) Date of Patent: May 7, 2024

(54) DIRECT DATA PLACEMENT

(71) Applicant: MELLANOX TECHNOLOGIES, LTD., Yokneam (IL)

(72) Inventors: Boris Pismenny, Haifa (IL); Dotan David Levi, Kiryat Motzkin (IL); Gal Yefet, Haifa (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/824,954

(22) Filed: May 26, 2022

(65) Prior Publication Data
US 2022/0385598 A1    Dec. 1, 2022

Related U.S. Application Data

(63) Continuation-in-part of application No. 17/535,608, filed on Nov. 25, 2021, now abandoned, which is a continuation of application No. 16/693,302, filed on Nov. 24, 2019, now Pat. No. 11,190,462, which is a continuation-in-part of application No. 15/473,668, filed on Mar. 30, 2017, now Pat. No. 10,516,710.

(60) Provisional application No. 62/457,919, filed on Feb. 12, 2017.

(51) Int. Cl.
| | |
|---|---|
| *H04L 65/61* | (2022.01) |
| *H04L 49/552* | (2022.01) |
| *H04L 49/90* | (2022.01) |
| *H04L 49/901* | (2022.01) |
| *H04L 49/9057* | (2022.01) |
| *H04L 65/65* | (2022.01) |
| *H04W 28/04* | (2009.01) |

(52) U.S. Cl.
CPC .......... *H04L 49/552* (2013.01); *H04L 49/901* (2013.01); *H04L 49/9057* (2013.01); *H04L 49/9068* (2013.01); *H04L 65/61* (2022.05); *H04L 65/65* (2022.05); *H04W 28/04* (2013.01)

(58) Field of Classification Search
CPC . H04L 49/552; H04L 49/901; H04L 49/9057; H04L 49/9068; H04L 65/61; H04L 65/65
See application file for complete search history.

(56) References Cited

U.S. PATENT DOCUMENTS

| | | | |
|---|---|---|---|
| 4,783,698 A | 11/1988 | Harney | |
| 4,783,736 A | 11/1988 | Ziegler et al. | |
| 5,668,809 A | 9/1997 | Rostoker et al. | |
| 5,949,441 A | 9/1999 | Ristau | |
| 6,041,397 A * | 3/2000 | Rickard | G06F 12/023 711/170 |
| 6,097,734 A | 8/2000 | Gotesman et al. | |
| 6,157,955 A | 12/2000 | Narad et al. | |

(Continued)

OTHER PUBLICATIONS

U.S. Appl. No. 17/542,426 Office Action dated Nov. 4, 2022.

(Continued)

*Primary Examiner* — SM A Rahman
(74) *Attorney, Agent, or Firm* — KLIGLER & ASSOCIATES PATENT ATTORNEYS LTD.

(57) ABSTRACT

A method for communication includes mapping transport sequence numbers in headers of data packets received from a network to respective buffers in a memory of a host computer. At least a part of the data from payloads of the received data packets is written directly to the respective buffers.

10 Claims, 3 Drawing Sheets

(56) References Cited

U.S. PATENT DOCUMENTS

| | | |
|---|---|---|
| 6,321,276 B1 | 11/2001 | Forin |
| 6,766,467 B1 | 7/2004 | Neal et al. |
| 6,786,143 B2 | 9/2004 | Craddock et al. |
| 6,981,027 B1 | 12/2005 | Gallo et al. |
| 7,171,484 B1 | 1/2007 | Krause et al. |
| 7,263,103 B2 | 8/2007 | Kagan et al. |
| 7,298,746 B1 | 11/2007 | De La Iglesia et al. |
| 7,299,266 B2 | 11/2007 | Boyd et al. |
| 7,464,198 B2 | 12/2008 | Martinez et al. |
| 7,522,606 B1 | 4/2009 | Sendrovitz |
| 7,733,464 B2 | 6/2010 | David et al. |
| 7,760,741 B2 | 7/2010 | Biran et al. |
| 7,881,496 B2 | 2/2011 | Camilleri et al. |
| 7,930,422 B2 | 4/2011 | Freimuth et al. |
| 8,051,212 B2 | 11/2011 | Kagan et al. |
| 8,176,252 B1 | 5/2012 | Alexander et al. |
| 8,218,770 B2 * | 7/2012 | Arulambalam ....... H04L 9/0894 380/278 |
| 8,495,301 B1 | 7/2013 | Alexander et al. |
| 8,638,796 B2 | 1/2014 | Dan et al. |
| 8,682,108 B2 | 3/2014 | Tian et al. |
| 8,693,551 B2 | 4/2014 | Zheludkov et al. |
| 8,751,701 B2 | 6/2014 | Shahar et al. |
| 9,131,235 B2 | 9/2015 | Zheludkov et al. |
| 9,143,467 B2 | 9/2015 | Kagan et al. |
| 9,270,299 B2 | 2/2016 | Luby et al. |
| 9,367,746 B2 | 6/2016 | Ishihara |
| 9,451,266 B2 | 9/2016 | Zheludkov et al. |
| 9,767,529 B1 | 9/2017 | Liu et al. |
| 10,210,125 B2 | 2/2019 | Burstein |
| 10,516,710 B2 | 12/2019 | Levi et al. |
| 10,637,828 B2 | 4/2020 | Kahalon et al. |
| 10,735,339 B1 | 8/2020 | Matthews et al. |
| 11,190,462 B2 | 11/2021 | Levi et al. |
| 11,669,464 B1 | 6/2023 | Bilski et al. |
| 2002/0041089 A1 | 4/2002 | Yasui |
| 2002/0152327 A1 | 10/2002 | Kagan et al. |
| 2003/0005164 A1 | 1/2003 | Trainin |
| 2003/0046530 A1 | 3/2003 | Poznanovic |
| 2004/0013117 A1 * | 1/2004 | Hendel ................. H04L 49/901 370/474 |
| 2004/0042483 A1 | 3/2004 | Elzur et al. |
| 2004/0146203 A1 | 7/2004 | Yoshimura et al. |
| 2004/0156379 A1 | 8/2004 | Walls et al. |
| 2004/0165091 A1 | 8/2004 | Takemura et al. |
| 2004/0221128 A1 | 11/2004 | Beecroft et al. |
| 2004/0230979 A1 | 11/2004 | Beecroft et al. |
| 2005/0135395 A1 | 6/2005 | Fan et al. |
| 2005/0135415 A1 * | 6/2005 | Fan ....................... H04L 69/161 370/468 |
| 2006/0075119 A1 | 4/2006 | Hussain et al. |
| 2006/0180670 A1 | 8/2006 | Acosta et al. |
| 2006/0256851 A1 | 11/2006 | Wang et al. |
| 2007/0124378 A1 | 5/2007 | Elzur |
| 2007/0162619 A1 | 7/2007 | Aloni et al. |
| 2007/0208820 A1 | 9/2007 | Makhervaks et al. |
| 2007/0211157 A1 | 9/2007 | Humpoletz et al. |
| 2007/0296849 A1 | 12/2007 | Sano et al. |
| 2008/0109562 A1 | 5/2008 | Ramakrishnan et al. |
| 2008/0143732 A1 | 6/2008 | Shiozaki |
| 2009/0021612 A1 | 1/2009 | Hamilton, Jr. et al. |
| 2009/0034633 A1 | 2/2009 | Rodriguez et al. |
| 2009/0074079 A1 | 3/2009 | Lee et al. |
| 2009/0083517 A1 | 3/2009 | Riddle |
| 2009/0153699 A1 | 6/2009 | Satoh et al. |
| 2009/0244288 A1 | 10/2009 | Fujimoto et al. |
| 2010/0121971 A1 | 5/2010 | Shao et al. |
| 2010/0149393 A1 | 6/2010 | Zarnowski et al. |
| 2010/0262973 A1 | 10/2010 | Ernst et al. |
| 2010/0265316 A1 | 10/2010 | Sali et al. |
| 2010/0274876 A1 | 10/2010 | Kagan et al. |
| 2011/0268194 A1 | 11/2011 | Nagano |
| 2011/0283156 A1 | 11/2011 | Hiie |
| 2012/0020413 A1 | 1/2012 | Chen et al. |
| 2012/0030451 A1 * | 2/2012 | Pong ................... G06F 9/30043 712/E9.016 |
| 2012/0033039 A1 | 2/2012 | Sasaki et al. |
| 2012/0147975 A1 | 6/2012 | Ju |
| 2013/0067193 A1 | 3/2013 | Kagan et al. |
| 2013/0191549 A1 | 7/2013 | Williams et al. |
| 2013/0322753 A1 | 12/2013 | Lim et al. |
| 2013/0329006 A1 | 12/2013 | Boles et al. |
| 2014/0068168 A1 | 3/2014 | Murrin et al. |
| 2014/0201587 A1 | 7/2014 | Luby et al. |
| 2014/0269893 A1 | 9/2014 | Parikh et al. |
| 2015/0026542 A1 | 1/2015 | Brennum |
| 2015/0063358 A1 | 3/2015 | Wu et al. |
| 2015/0085863 A1 | 3/2015 | Wu et al. |
| 2015/0181211 A1 | 6/2015 | He |
| 2015/0373075 A1 | 12/2015 | Perlman et al. |
| 2016/0080755 A1 | 3/2016 | Toma et al. |
| 2016/0277473 A1 | 9/2016 | Botsford et al. |
| 2016/0337426 A1 | 11/2016 | Shribman et al. |
| 2017/0171167 A1 | 6/2017 | Suzuki |
| 2017/0242590 A1 | 8/2017 | Gokhale et al. |
| 2018/0367525 A1 | 12/2018 | Kassimis et al. |
| 2018/0367589 A1 | 12/2018 | Levi et al. |
| 2019/0018785 A1 | 1/2019 | Beard et al. |
| 2020/0076521 A1 | 3/2020 | Hammond |
| 2020/0245016 A1 | 7/2020 | Levi et al. |
| 2020/0341940 A1 | 10/2020 | Parambil et al. |
| 2021/0049097 A1 | 2/2021 | Fang et al. |
| 2022/0070797 A1 | 3/2022 | Berg et al. |
| 2022/0086105 A1 | 3/2022 | Levi et al. |
| 2022/0095007 A1 | 3/2022 | Levi et al. |
| 2022/0158955 A1 * | 5/2022 | Yeh ..................... H04L 49/9057 |
| 2022/0283964 A1 | 9/2022 | Burstein et al. |
| 2022/0413886 A1 | 12/2022 | Griffy et al. |

OTHER PUBLICATIONS

Infiniband Trade Association, "InfiniBandTM Architecture Specification", vol. 1, release 1.2.1, pp. 1-1727, Nov. 2007.

"MPI: A Message-Passing Interface Standard", version 2.2, Message Passing Interface Forum, pp. 1-647, Sep. 4, 2009.

Shah et al., "Direct Data Placement over Reliable Transports", IETF Network Working Group, RFC 5041, pp. 1-38, Oct. 2007.

Culley et al., "Marker PDU Aligned Framing for TCP Specification", IETF Network Working Group, RFC 5044, pp. 1-74, Oct. 2007.

"Linux kernel enable the IOMMU—input/output memory management unit support", pp. 1-2, Oct. 15, 2007, as downloaded from http://www.cyberciti.biz/tips/howto-turn-on-linux-software-iommu-support.html.

SMPTE Standard 2110-20:2017, "Professional Media Over Managed IP Networks: Uncompressed Active Video", The Society of Motion Picture and Television Engineers, pp. 1-23, Aug. 10, 2017.

SMPTE Standard 2110-30:201y, "Professional Media over IP Networks—PCM Digital Audio", The Society of Motion Picture and Television Engineers, pp. 1-7, Jan. 26, 2017.

SMPTE Standard 2110-21:201y, "Professional Media Over IP Networks: Timing Model for Uncompressed Active Video", The Society of Motion Picture and Television Engineers, pp. 1-15, Jan. 18, 2017.

SMPTE Standard 2110-10:201y, "Professional Media over IP Networks: System Timing and Definitions", The Society of Motion Picture and Television Engineers, pp. 1-12, Jan. 26, 2017.

Wikipedia, "Common Public Radio Interface", pp. 1-1, last edited Apr. 28, 2017, as downloaded from https://web.archive.org/web/20190620212239/https://en.wikipedia.org/wiki/Common_Public_Radio_Interface.

O-RAN Alliance, "O-RAN Fronthaul Working Group: Control, User and Synchronization Plane Specification", ORAN-WG4.CUS.0-v01.00 Technical Specification, pp. 1-189, year 2019.

Wikipedia, "evolved Common Public Radio Interface (eCPRI)", pp. 1-3, May 13, 2019, as downloaded from https://web.archive.org/web/20190513130801/https://wiki.wireshark.org/eCPRI.

Main Concept, "MainConcept Accelerates HEVC Encoding with NVIDIA RTX GPUs", newsletter, pp. 1-4, Apr. 8, 2019, as down-

(56) References Cited

OTHER PUBLICATIONS loaded from https://www.mainconcept.com/company/news/news-article/article/mainconcept-accelerates-hevc-encoding-with-nvidia-rtx-gpus.html.
Marcovitch et al., U.S. Appl. No. 17/590,339, filed Feb. 1, 2022.
Baker et al., "OpenSHMEM Application Programming Interface," version 1.5, www.openshmem.org, pp. 1-180, Jun. 8, 2020.
Marcovitch et al., U.S. Appl. No. 17/858,104, filed Jul. 6, 2022.
Marcovitch et al., U.S. Appl. No. 17/858,097, filed Jul. 6, 2022.
Marcovitch et al., U.S. Appl. No. 17/858,102, filed Jul. 6, 2022.
Schulzrinne et al., "RTP: A Transport Protocol for Real-Time Applications," Request for Comments 3550, pp. 1-104, Jul. 2003.
SMPTE Standard 2022-6:2012—"Transport of High Bit Rate Media Signals over IP Networks (HBRMT)", The Society of Motion Picture and Television Engineers, pp. 1-16, Oct. 9, 2012.
Sjoberg et al., "RTP Payload Format and File Storage Format for the Adaptive Multi-Rate (AMR) and Adaptive Multi-Rate Wideband (AMR-WB) Audio Codecs," Network Working Group, Request for Comments 4867, pp. 1-59, Apr. 2007.
U.S. Appl. No. 17/858,097 Office Action dated Aug. 9, 2023.
U.S. Appl. No. 17/858,102 Office Action dated Oct. 24, 2023.
U.S. Appl. No. 17/858,097 Office Action dated Dec. 13, 2023.
U.S. Appl. No. 17/858,104 Office Action dated Dec. 8, 2023.

\* cited by examiner

DIRECT DATA PLACEMENT

CROSS-REFERENCE TO RELATED APPLICATION

This application is a continuation in part of U.S. patent application Ser. No. 17/535,608, filed Nov. 25, 2021, which is a continuation of U.S. patent application Ser. No. 16/693,302, filed Nov. 24, 2019 (now U.S. Pat. No. 11,190,462), which is a continuation in part of U.S. patent application Ser. No. 15/473,668, filed Mar. 30, 2017 (now U.S. Pat. No. 10,516,710), which claims the benefit of U.S. Provisional Patent Application 62/457,919, filed Feb. 12, 2017. All of these related applications are incorporated herein by reference.

FIELD OF THE INVENTION

The present invention relates to apparatus and methods for efficient processing of packet streams received across a network.

BACKGROUND

The Transmission Control Protocol (TCP) is a transport-layer protocol providing reliable, ordered, and error-checked delivery of a stream of bytes via an Internet Protocol (IP) network between applications running on host computers. TCP divides a data stream into chunks and adds a TCP header to each chunk, thus creating a TCP segment, which is then encapsulated in an IP packet for transmission over the network. The TCP header includes a sequence number field, which indicates the cumulative byte sequence number within the current stream of the first byte in this TCP segment.

TCP is optimized for accurate delivery, rather than speed, and can incur long delays in waiting for out-of-order packets and retransmissions of lost packets. Handling the complexities of TCP imposes a considerable burden on the central processing unit (CPU) of the host processor and can create bottlenecks in delivery of data to the application to which the data stream is directed.

In response to these problems, a variety of hardware accelerators, for offloading some or all of the tasks of TCP data delivery from the CPU, have been described in the patent literature. For example, U.S. Pat. No. 7,760,741 describes a network acceleration architecture for use with TCP, iSCSI and/or RDMA over TCP, including a hardware acceleration engine adapted for communication with and processing data from a consumer application in a system that supports TCP, iSCSI and RDMA over TCP, a software protocol processor adapted for carrying out TCP implementation, and an asynchronous dual-queue interface for exchanging information between the hardware acceleration engine and the software protocol processor. The hardware acceleration engine and the software protocol processor are adapted to operate asynchronously and independently of one another.

As another example, U.S. Pat. No. 10,637,828 describes a network interface controller (NIC) with stateful connection tracking. The NIC includes hardware logic, which accesses a list of active connections established between local processes running on the host processor and corresponding processes on other computers on the network and maintains context information with respect to each of the active connections. Upon receiving a packet from the network having a header identifying the packet as having been transmitted to a local process in accordance with a predefined transport protocol, the hardware logic checks the list to find a connection to which the packet belongs and upon finding the connection, verifies that the packet conforms to the respective state indicated by the context information for the connection and, if so, updates the context information and passes the packet to the local process.

SUMMARY

Embodiments of the present invention that are described herein provide efficient apparatus and methods for receiving and handling data streams from a network.

There is therefore provided, in accordance with an embodiment of the invention, a method for communication, which includes mapping transport sequence numbers in headers of data packets received from a network to respective buffers in a memory of a host computer. At least a part of the data is written from payloads of the received data packets directly to the respective buffers.

In some embodiments, writing at least a part of the data includes receiving the data packets in a network interface controller (NIC) of the host computer, and writing the data from the NIC directly to the memory.

In some of these embodiments, mapping the transport sequence numbers includes defining first buffers in the memory, having a given buffer size, to which the transport sequence numbers are mapped, and writing the data includes receiving work requests from the host computer defining second buffers in the memory, writing the headers of the received data packets to the second buffers responsively to the work requests, writing the data from the payloads of the received data packets to the first buffers up to the given buffer size, and when a size of the data in a given data packet exceeds the given buffer size, writing a remainder of the data from the given data packet to one of the second buffers.

In some embodiments, mapping the transport sequence numbers includes looking up the first buffers in a table that is indexed according to the transport sequence numbers. In a disclosed embodiment, writing the data includes, upon receiving a data packet having a transport sequence number that is absent from the table, writing all the data from a payload of the received data packet to at least one of the second buffers. Additionally or alternatively, the method includes, after the host computer has read the data from a given first buffer that is indexed by a given transport sequence number, updating the table to remove the given transport sequence number from the table and to add a new first buffer that is indexed by a further transport sequence number.

In a disclosed embodiment, the headers include Transmission Control Protocol (TCP) headers, and the transport sequence numbers include TCP sequence numbers.

There is also provided, in accordance with an embodiment of the invention, communication apparatus, including a network interface, to receive from a network data packets including headers containing respective transport sequence numbers and payloads containing data, and a host interface, for connection to a host computer having a memory. Processing circuitry maps the transport sequence numbers in headers of data packets received from a network to respective buffers in the memory of the host computer and writes at least a part of the data from the payloads of the received data packets to the respective buffers.

The present invention will be more fully understood from the following detailed description of the embodiments thereof, taken together with the drawings in which:

DETAILED DESCRIPTION OF EMBODIMENTS

Figure 1:
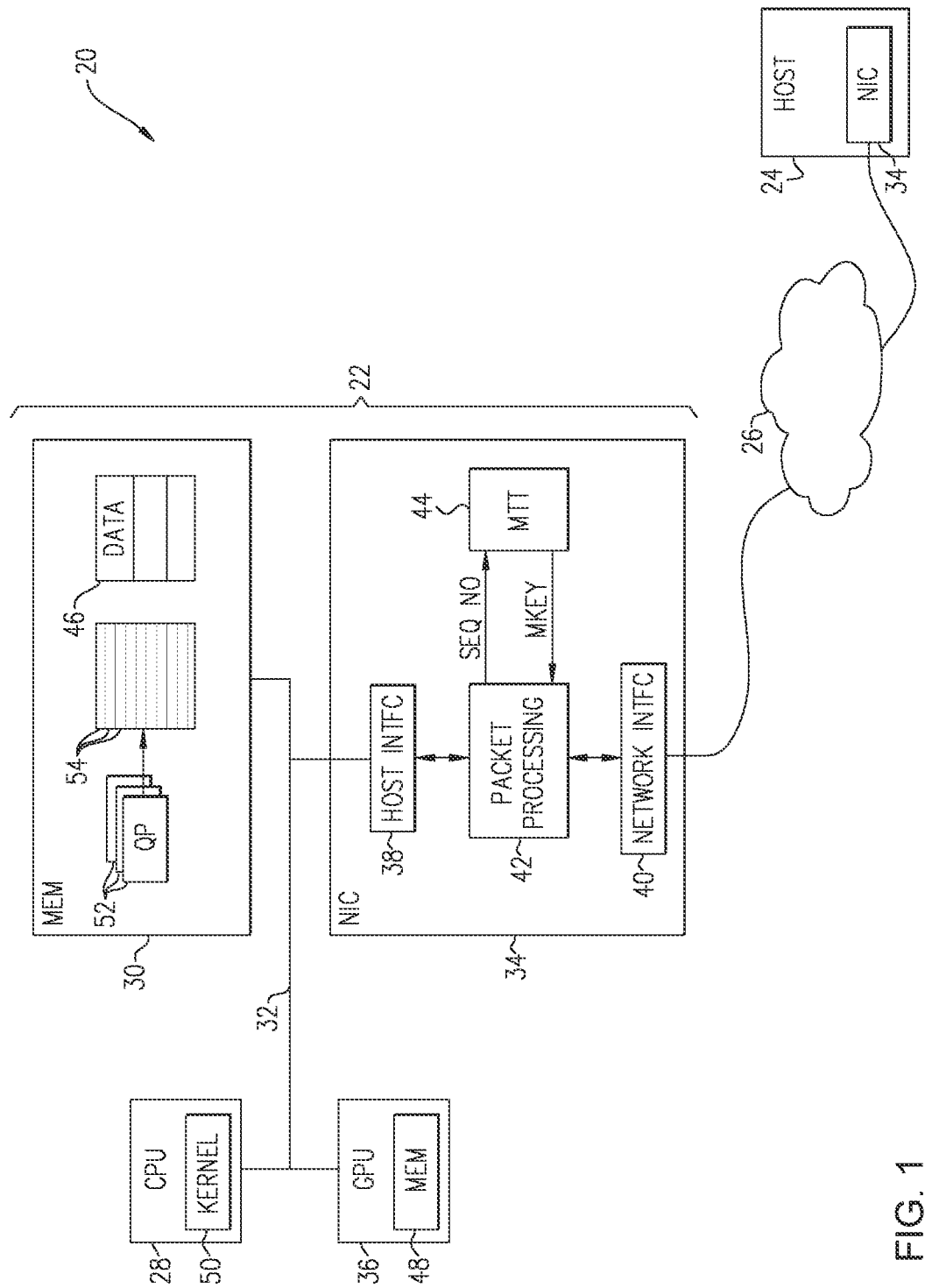
FIG. 1 is a block diagram that schematically illustrates a data communication system, in accordance with an embodiment of the invention.

In many transport protocols that are used in IP networks, such as TCP and the Real-time Transport Protocol (RTP), the packet headers contain respective transport sequence numbers, which can be used at the destination in detecting missing packets and restoring the packet data to the transmit order.

Embodiments of the present invention use these transport sequence numbers for another purpose, in offloading data handling tasks from the CPU to hardware logic, for example to hardware logic in a NIC. In these embodiments, the transport sequence numbers of data packets received from a network are mapped to respective buffers in a memory of the host computer, and at least a part of the data in the payloads of the received data packets are written directly to the respective buffers. In the parent patent applications, which are cited above, the mapping is carried out with respect to RTP packet sequence numbers. In the embodiments that are described hereinbelow, the TCP sequence numbers are used for this purpose.

In the context of the present description and in the claims, the term "directly" means that the data are written by hardware logic, for example in the NIC, to the memory of the host computer by direct memory access (DMA). The CPU, under the control of suitable software, may define the buffers and provide the mapping criteria to the hardware, but the data are written to the buffers without CPU involvement. The memory of the host computer to which the hardware logic writes the data may be the system memory of the CPU, or it may, additionally or alternatively, comprise other ranges of memory in the host computer, such as memories of peripheral devices, for example of a graphics processing unit (GPU).

Typically, the buffers to which the transport sequence numbers are mapped have a certain given buffer size. In some embodiments, the NIC also receives work requests from the host computer defining second buffers in the memory of the host computer, for example in the system memory of the CPU. In response to these work requests, the NIC writes the headers of the received data packets to these second buffers, while writing the data from the payloads of the received data packets to the buffers to which the transport sequence numbers are mapped up to the given buffer size. When the size of the data in a given data packet exceeds the given buffer size, the NIC writes the remainder of the data from the given data packet to one of the second buffers.

This technique for data handling and buffer management is particularly useful in TCP data exchange, as it enables the hardware logic to write incoming data efficiently using the sequence number mapping, while leaving the headers and protocol processing tasks to the CPU, under software control, using the header data in the second buffers. Software involvement in handling payload data is needed only in the unusual cases in which the data size exceeds the size of the buffer to which the sequence number is mapped, or when there is no mapping available for a given TCP packet or connection.

Although the present embodiments are directed specifically to handling of TCP packets by a NIC, the principles of the present invention may alternatively be applied, mutatis mutandis, to other transport protocols, as well as to offload of data handling tasks to other sorts of hardware logic devices.

FIG. 1 is a block diagram that schematically illustrates a data communication system 20, in accordance with an embodiment of the invention. In the pictured scenario, host computers 22 and 24 are connected to a packet data network 26, such as an Internet Protocol (IP) network, for example, by respective NICs 34. For the sake of clarity and concreteness, the description below relates specifically to transmission of TCP/IP packets from host computer 24 to host computer 22. In practice, however, such packets may also be transmitted from host computer 22 to host computer 24, as well as to and from other computers (not shown) on network 26.

Host computer 22 comprises a CPU 28 and a system memory 30, typically comprising random-access memory (RAM), which are connected to a peripheral component bus 32, such as a PCI Express™ (PCIe™) bus. CPU 28 runs an operating system, including a kernel 50, as well as user applications. Kernel 50 includes a TCP processing stack. NIC 34 communicates with CPU 28 and memory 30 via bus 32 and may similarly communicate over bus 32 with other peripheral devices, such as a GPU 36.

NIC 34 is connected to bus 32 through a host interface 38, comprising a suitable PCIe interface, for example. NIC 34 also comprises a network interface 40, in the form of one or more physical network ports configured for connection to network 26. Interfaces 38 and 40 typically comprise suitable analog and digital hardware circuits, implementing the applicable physical layer and data link standards for communication over bus 32 and network 26.

Packet processing circuitry 42 in NIC 32 is connected between network interface 40 and host interface 38 and comprises both a transmit pipe, which handles outgoing packets for transmission to network 26, and a receive pipe, which handles incoming packets received from network 26. Packet processing circuitry 42 typically comprises hardware logic circuits, which may be programmable or hard-wired and are configured to carry out the functions described herein, as well as other packet processing functions that are known in the art. Additionally or alternatively, at least some of these functions can be carried out by an embedded processor in NIC 34 under the control of software or firmware.

The description that follows will focus on the functionality of the receive pipe of packet processing circuitry 42 in handling incoming TCP/IP traffic. In general, NIC 34 handles packet traffic of other sorts, as well, but these other functions are beyond the scope of the present description. For the sake of clarity, the physical components of NIC 34 are shown in FIG. 1 as multiple, separate functional blocks. In practice, however, these components are typically (although not necessarily) implemented as hardware and firmware components within a single integrated circuit chip or chipset, possibly together with CPU 28, as well. Although FIG. 1 shows one possible implementation of NIC 34, other implementations will be apparent to those skilled in the art after reading the present description and are considered to be within the scope of the present invention.

To communicate with peer applications on host computer 24, applications running on CPU 28 submit work requests (known as work queue elements, or WQEs) to respective queue pairs (QPs) 52, which serve as work queues to queue and deliver the WUQEs to NIC 34. The WQEs point to buffers 54 in memory, including send buffers from which packet processing circuitry 42 reads data for transmission in packets over network 26 and receive buffers, to which the packet processing circuitry writes data from packets received over the network. As packet processing circuitry 42 receives incoming TCP/IP packets from host computer 24, it reads WQEs from the appropriate QP 52 and then writes at least the packet headers to the buffers 54 indicated by the WQEs.

In addition, in embodiments of the present invention, applications running on CPU 28 are able to define data buffers 46 of a given size in memory 30 to receive payload data from incoming TCP/IP packets. Each data buffer 46 is associated with a memory key (MKEY), which indicates the offset of the buffer address in memory 30 and the size of the buffer, and possibly other buffer features such as access permissions. CPU 28 assigns data buffers 46 to respective TCP connections, which are identified by respective TCP 5-tuples (made up of the IP source address, destination address, and protocol number, along with the TCP source port and destination port). For each such TCP 5-tuple, CPU 28 maps the TCP sequence numbers of packets received on the corresponding connections to MKEY values.

CPU 28 writes the mapping to a memory translation table (MTT) 44 in NIC 34. MTT 44 normally maps the virtual addresses of pages of memory to physical addresses. In the present embodiment, MTT 44 is indexed by the TCP sequence numbers of the applicable 5-tuples and returns the corresponding MKEY and offset values. CPU 28 may invoke firmware commands to create MKEYs, with corresponding MTTs to map user or kernal memory to NIC 34. Additionally or alternatively, a special User-mode Registered Memory (UMR) WQE can be used to update the memory mapping of an existing MKEY. MTT 44 may also be referred to as a translation and protection table (TPT). Further details of the structure and functionality of such tables are described, for example, in U.S. patent application Ser. No. 17/189,303, filed Mar. 2, 2021, whose disclosure is incorporated herein by reference.

Additionally or alternatively, buffers 46 and the corresponding MKEY mappings may be defined in a memory 48 of GPU 36 and/or other peripheral devices. This model is advantageous in enabling NIC 34 to write the payload data directly to the memory of the peripheral device, while packet headers are written to buffers 54 for processing by the TCP stack in kernel 50. As long as the buffers in memory 48 are able to accommodate all the payload data, this arrangement enables GPU 36 to process the data immediately and obviates the need to copy incoming data through memory 30.

Figure 2:
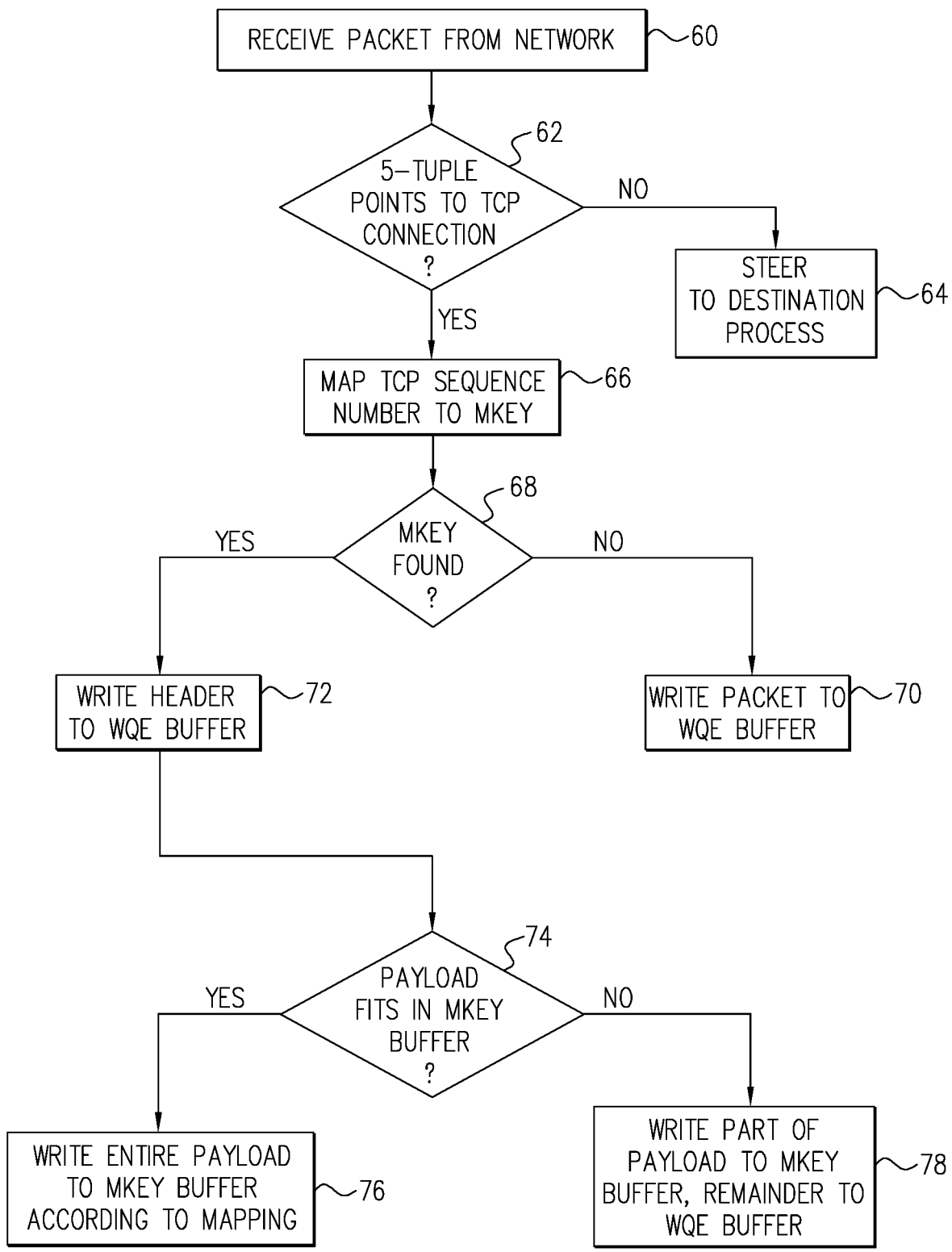
FIG. 2 is a flow chart that schematically illustrates a method for handling data packets received from a network, in accordance with an embodiment of the invention.

FIG. 2 is a flow chart that schematically illustrates a method carried out by NIC 34 in handling data packets received from network 26, in accordance with an embodiment of the invention. The method is initiated when NIC 34 receives an incoming data packet from network 26, at a packet reception step 60. Steering logic in packet processing circuitry 42 extracts and parses the 5-tuple from the IP and transport headers of the packet, in order to identify the QP 52 (and hence the process on CPU 28) to which the packet is directed, at a parsing step 62. If the 5-tuple indicates that the packet is not a TCP/IP packet, packet processing circuitry 42 steers the packet to the appropriate destination on host computer 22 for further handling in accordance with the applicable protocol, at a packet steering step 64. This processing is beyond the scope of the present description.

When the 5-tuple is found at step 62 to belong to a TCP connection, packet processing circuitry 42 attempts to map the 5-tuple and TCP sequence number to an MKEY value in MTT 44, at a mapping step 66. Packet processing circuitry 42 checks whether a mapping exists from this sequence number to an MKEY value, at a mapping identification step 68. In some cases, not all TCP 5-tuples are mapped to MTT 44. In other cases, even when the TCP 5-tuple has been configured for MKEY mapping, the present TCP sequence number may not appear in MTT 44, for example due to a loss of synchronization between the transmitted TCP/IP packet stream and the handling of these packets by network 26. In such cases, packet processing circuitry 42 reads a WQE from the receive queue of the corresponding QP 52 and writes the entire packet, including both header and payload, to a buffer 54 indicated by the WQE, at a WQE handling step 70. The TCP processing stack running on CPU 28 will then handle the packet header and will pass the payload to the destination process or device, for example to GPU 36.

When the 5-tuple and TCP sequence number are found to be mapped to an MKEY value in MTT 44 at step 68, packet processing circuitry 42 reads a WQE from the appropriate QP 52 and writes only the packet header to the buffer 54 indicated by the WQE, at a header writing step 72. The TCP processing stack running on CPU 28 reads and processes the headers and performs the appropriate protocol functions, including sending acknowledgments and requesting retransmission when needed, for example.

Packet processing circuitry 42 attempts to write the data from the payload of the received data packet to the buffer 46 that is indicated by the MKEY value, at a data writing step 74. The TCP sequence number indicates the starting address within buffer 46 for writing the payload data. When the payload fits into buffer 46, packet processing circuitry 42 writes the entire payload to this buffer, at a complete payload writing step 76. When the size of the data in in the packet payload exceeds the size of the buffer 46 indicated by the MKEY value, packet processing circuitry 42 writes a part of the payload data to buffer 46 (up to the available size of the buffer), and writes the remainder of the payload data to one of buffers 54 in memory 30, at a partial payload writing step 78. This remainder of the payload may be written to the continuation of the same buffer 54 to which the header was written at step 72 or to a different buffer.

Figure 3:
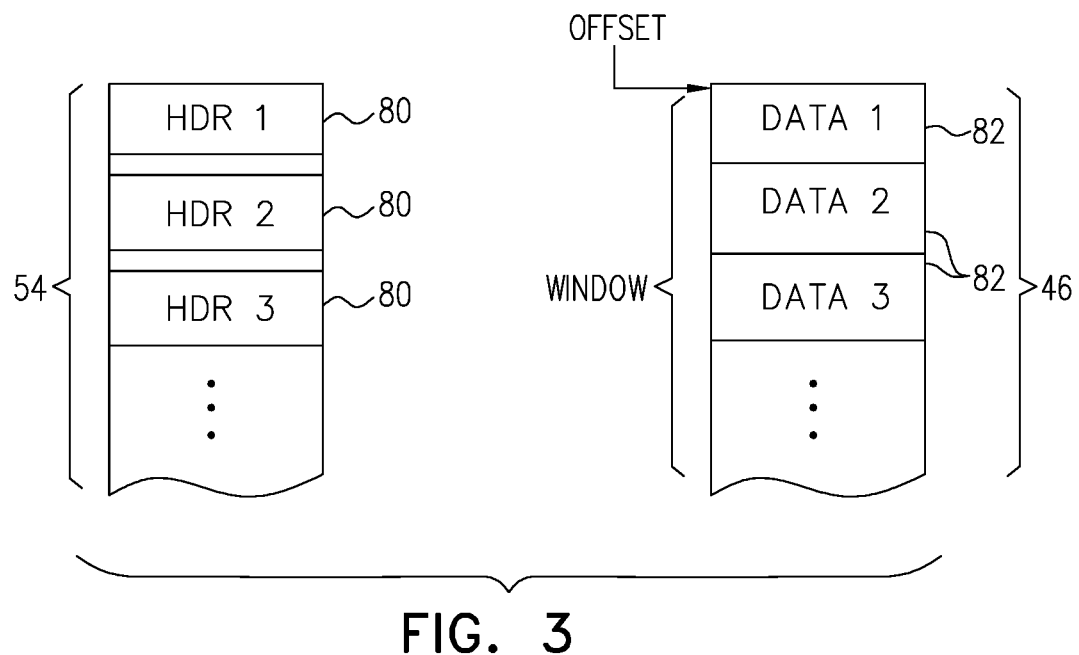
FIGS. 3 and 4 are block diagrams that schematically illustrate placement of data in packets received from a network into memory buffers, in accordance with an embodiment of the invention.
Figure 4:
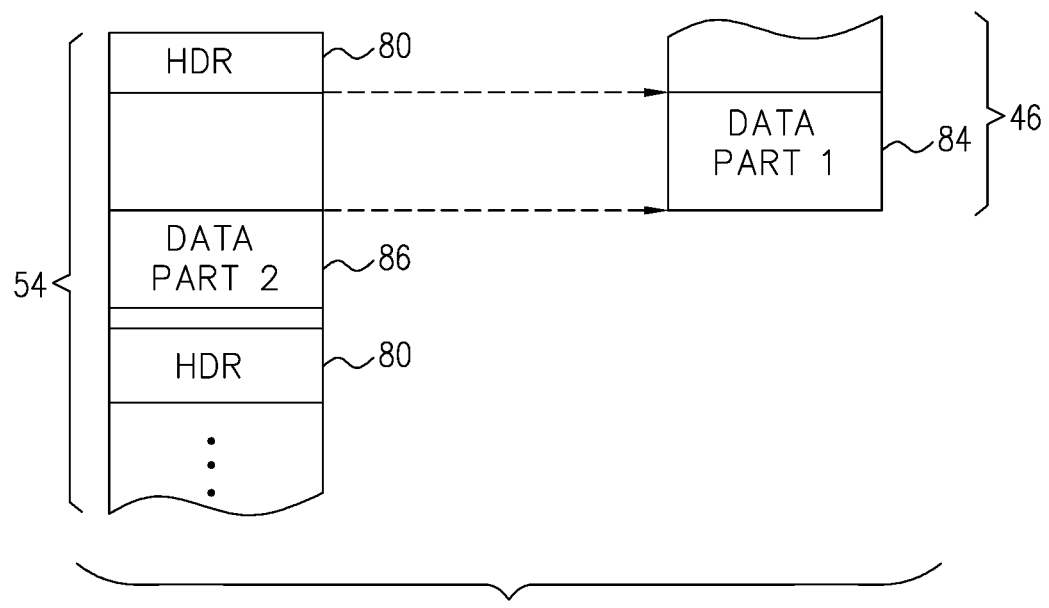

FIGS. 3 and 4 are block diagrams that schematically illustrate placement of data in TCP/IP packets received from network 26 into memory buffers 46 and 54, in accordance with an embodiment of the invention. FIG. 3 illustrates the usual case, in which payloads 82 of a sequence of TCP/IP packets are written in their entirety to buffer 46, as at step 76. FIG. 4 illustrates a case in which a packet payload exceeds the given size of buffer 46, as at step 78. As noted earlier, buffer 46 may be defined in system memory 30 or in another memory of host computer 22, such as memory 48 of a peripheral device.

In the example shown in FIG. 3, packet processing circuitry 42 writes headers 80 of successive packets to buffer 54, as indicated by one or more WQEs read from memory 30, while writing payloads 82 in sequence to buffer 46. MTT 44 indicates the offset in the memory of an initial TCP sequence number in buffer 46, as well as the size of the buffer. The offset (in bytes) for each subsequent TCP segment is equal to the sum of the TCP sequence number with the initial offset. CPU 28 may set the size of buffer 46, for example, according to the current size of the TCP window for the connection corresponding to this TCP 5-tuple. Because payloads 82 are indexed by their respective sequence numbers, packet processing circuitry 42 writes the payload data to buffer 46 in the proper order, without gaps between successive payloads, even when NIC 34 receives the packets out of order from network 26. The destination application or device on host computer 22 is thus able to read and process the data directly from buffer 46 without involvement of kernel 50.

After the destination process on host computer 22 has read the data from buffer 46 that is indexed by a given transport sequence number, CPU 28 updates MTT 44 to remove this transport sequence number from the MTT and to add a new buffer that is indexed by a further transport sequence number. As a result, buffer 46 operates as a sort of circular buffer, to which packet processing circuitry 42 can continually write new data arriving in TCP/IP packets.

In the example shown in FIG. 4, only a first part 84 of the payload data of a certain TCP/IP packet fits within the size of buffer 46. After writing this part 84 to buffer 46, packet processing circuitry 42 writes the remainder 86 of the payload data to buffer 54, as indicated by a corresponding WQE. The packet processing circuitry leaves a gap in buffer 54 corresponding to the length of the data that was written to buffer 46. In this case CPU 28 will reconstruct and reorder the data for delivery to the target application or device.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
 receiving data packets from a network in a network interface controller (NIC) of the host computer; mapping transport sequence numbers in headers of data packets received from a network to respective buffers, having a given buffer size, in a memory of a host computer;
 receiving work requests from the host computer defining second buffers in the memory;
 writing at least a part of the data from payloads of the received data packets directly from the NIC to the respective first buffers up to the given buffer size;
 writing the headers of the received data packets from the NIC to the second buffers responsively to the work requests; and
 when a size of the data in a given data packet exceeds the given buffer size, writing a remainder of the data from the given data packet from the NIC to one of the second buffers.

2. The method according to claim 1, wherein mapping the transport sequence numbers comprises looking up the first buffers in a table that is indexed according to the transport sequence numbers.

3. The method according to claim 2, wherein writing the data comprises, upon receiving a data packet having a transport sequence number that is absent from the table, writing all the data from a payload of the received data packet to at least one of the second buffers.

4. The method according to comprising, after the host computer has read the data from a given first buffer that is indexed by a given transport sequence number, updating the table to remove the given transport sequence number from the table and to add a new first buffer that is indexed by a further transport sequence number.

5. The apparatus according to claim 1, wherein the headers comprise Transmission Control Protocol (TCP) headers, and the transport sequence numbers comprise TCP sequence numbers.

6. Communication apparatus, comprising:
 a network interface, to receive from a network data packets comprising headers containing respective transport sequence numbers and payloads containing data;
 a host interface, for connection to a host computer having a memory; and
 processing circuitry, to map the transport sequence numbers in headers of data packets received from a network to respective buffers in the memory of the host computer and to write at least a part of the data from the payloads of the received data packets to the respective buffers.

7. The apparatus according to claim 6, wherein the processing circuitry is to map the transport sequence numbers to the respective first buffers using a table that is indexed according to the transport sequence numbers.

8. The apparatus according to claim 7, wherein upon receiving a data packet having a transport sequence number that is absent from the table, the processing circuitry is to write all the data from a payload of the received data packet to the second buffers.

9. The apparatus according to claim 6, wherein after the host computer has read the data from a given first buffer that is indexed by a given transport sequence number, the table is updated to remove the given transport sequence number from the table and to add a new first buffer that is indexed by a further transport sequence number.

10. The apparatus according to claim 6, wherein the headers comprise Transmission Control Protocol (TCP) headers, and the transport sequence numbers comprise TCP sequence numbers.

* * * * *